No. 790,838.

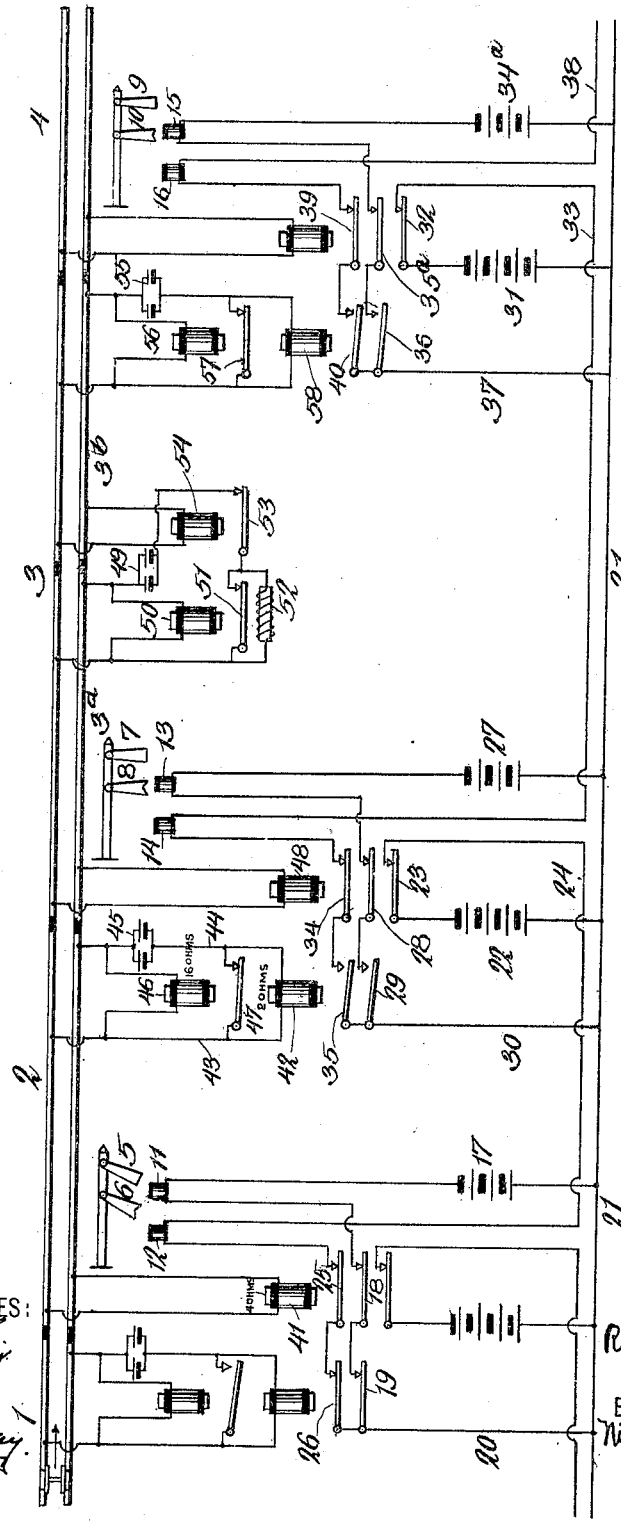

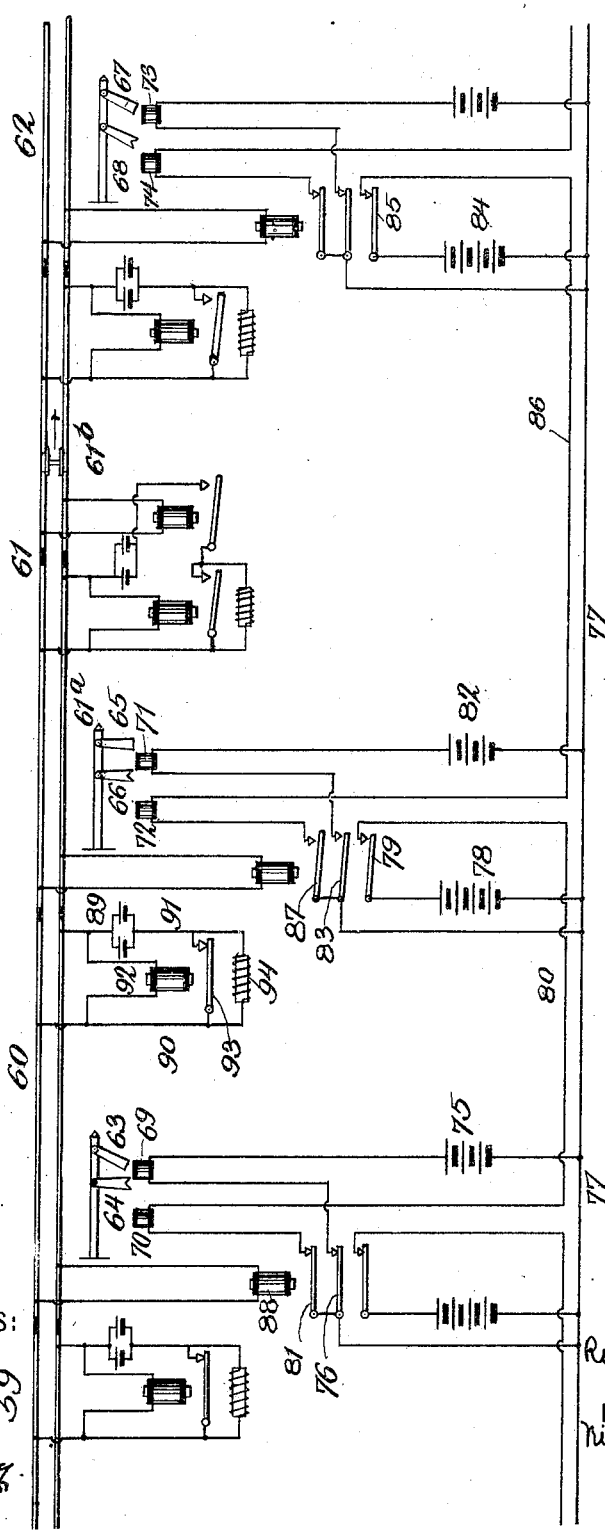

Patented May 23, 1905.

UNITED STATES PATENT OFFICE.

ROBERT J. HEWETT, OF WESTFIELD, NEW JERSEY, ASSIGNOR TO THE HALL SIGNAL COMPANY, A CORPORATION OF MAINE.

ELECTRICAL DEVICE OR CIRCUIT.

SPECIFICATION forming part of Letters Patent No. 790,838, dated May 23, 1905.

Application filed August 11, 1904. Serial No. 220,306.

*To all whom it may concern:*

Be it known that I, ROBERT J. HEWETT, a citizen of the United States, and a resident of Westfield, Union county, New Jersey, have invented certain new and useful Improvements in Electrical Devices or Circuits, of which the following is a specification.

This invention relates to improvements in electrical devices and circuits, and more particularly such as are adapted and designed for use in connection with electric signaling systems for railways.

The invention seeks, among other things, to effect a saving in the output of the generator employed and also to increase the reliability of the operation of the circuits or circuit.

The invention will be best understood in its application to a railway signaling system.

In the accompanying drawings, Figure 1 shows the signaling system to which the invention is applied, the signals being arranged normally at "danger." Fig. 2 is a somewhat similar signaling system with the signals standing normally at "safety" and to which one form of the invention is applied.

Referring now to Fig. 1, 1, 2, 3, and 4 indicate blocks of the railway. Block 2 is guarded by home and distant signals 5 and 6. Block 3 is guarded by home and distant signals 7 and 8. Block 4 is guarded by home and distant signals 9 and 10. 11 and 12 are the clutch-magnets or other operating or controlling devices associated with signals 5 and 6. 13 and 14 are similar clutch-magnets or devices associated with signals 7 and 8. 15 and 16 are similar clutch-magnets or devices associated with signals 9 and 10. The signaling-circuit for home signal 5 may be traced from battery 17, through clutch-magnet 11, circuit-controllers 18 and 19, wire 20, return-wire 21, back to battery. The signal-circuit for distant signal 6 may be traced from battery 22, through circuit-controller 23, wire 24, clutch-magnet 12, circuit-controllers 25 and 26, wire 20, return-wire 21, back to battery. The signal-circuit for home signal 7 may be traced from battery 27, through clutch-magnet 13, circuit-controllers 28 and 29, wires 30 and 21, back to battery. The signal-circuit for distant signal 8 may be traced from battery 31, through circuit-controller 32, wire 33, clutch-magnet 14, circuit-controllers 34 and 35, and wires 30 and 21, back to battery. The signal-circuit for home signal 9 may be traced from battery $34^a$, through clutch-magnet 15, circuit-controllers $35^a$ and 36, and wires 37 and 21 to battery. The signal-circuit for distant signal 10 may be traced from battery, corresponding to battery 31, through wire 38, clutch-magnet 16, circuit-controllers 39 and 40, and wires 37 and 21, back to battery. 41 is the track-magnet associated with block 2 and operating circuit-controllers 25 and 18. 42 is a clearing-magnet connected by wires 43 and 44 to the rails of block 2 and in circuit with magnet 41 and battery 45. 46 is a controlling-magnet connected in multiple with magnet 41 or in a bridge across wires 43 and 44. It operates circuit-controller 47, connected in a shunt around magnet 42 and bridging wires 43 and 44. Controlling-magnet 46 is a high-resistance magnet, being wound to, say, about sixteen ohms. Clearing-magnet 42 is a low-resistance magnet, being wound to, say, about two or three ohms. Track-magnet 41 is wound to, say, about four ohms. In the normal condition of the track-circuit, and as shown in Fig. 1, current from battery 45 flows through the rails of the track and magnet 41 and circuit-controller 47. It also flows in a circuit through magnet 46, wire 43, circuit-controller 47, and wire 44, back to battery. This current energizes track-magnet 41 and holds circuit-controllers 18 and 25 closed. This current also energizes controlling-magnet 46, which holds circuit-controller 47 closed, thereby shunting current from magnet 42 and keeping this latter magnet deënergized and the circuit-controllers 29 and 35 open. When the train enters block 2, it shunts track-magnet 41, thereby deënergizing it. It also shunts magnet 46, thereby deënergizing it. Magnet 46 thereupon releases circuit-controller 47, so that all the current from battery 45 now flows through magnet 42. This energizes the magnet. In this track-circuit it will be seen that magnet 41 acts as a resistance to cause part of the current of battery 45 to flow through magnet 46 and energize the latter. It will also be seen that when the resistance of magnet 41 is removed magnet 46 is thereupon shunted, and hence deënergized. When the train passes off of block 2, the current from battery 45 flows in a circuit which includes magnets 46 and 42. This energizes magnet 46 and closes circuit-controller 47, so as to shunt magnet 42, and thereby deënergize it. The current from battery 45 then flows in a circuit which includes magnet 46 and circuit-controller 47 and also in a circuit which includes rails of the track, magnet 41, and circuit-controller 47, and thus the track-circuit is restored to its normal condition. Block 3 is divided into two subsections 3$^a$ and 3$^b$. 48 is the track-magnet of subsection 3$^a$ and operating circuit-controllers 23, 28, and 34. 49 is a battery for this track-circuit. Controlling-magnet 50, circuit-controller 51, and resistance 52 are respectively connected in this track-circuit in the same way as are magnet 46, circuit-controller 47, and magnet 42 of the rear track-circuit. The track-circuit of battery 49 also includes circuit-controller 53, operated by track-magnet 54, associated with subsection 3$^b$. 55 is the track-battery for subsection 3$^b$. Controlling-magnet 56, circuit-controller 57, and clearing-magnet 58 are connected in this latter track-circuit in the same way as are the corresponding parts of track-circuit for block 2. It will be seen that track-magnet 54, through its circuit-controller 53, controls track-magnet 48, so that as long as the train is on subsection 3$^b$ it will continue to deënergize magnet 48 just as it did while in subsection 3$^a$. As long as a train is in subsection 3$^a$ it operates upon the track-circuit and devices of this subsection in precisely the same way as it did upon the track-circuit of block 2. Inasmuch as track-section of subsection 3$^a$ is not required to clear a signal in advance, the clearing-magnet is omitted from this track-circuit, and the simple resistance 52 is substituted therefor. The advantage of this resistance 52 in this track-circuit will appear more fully in connection with the description of Fig. 2.

The operation of the circuits shown in Fig. 1 will be readily understood with a few additional words of explanation. The circuits are shown in their active condition with reference to the presence of a train in block 1. When the train is in block 1, it causes the normally open circuit-controllers 19 and 26 to be closed, thereby closing the circuits through clutch-magnets 11 and 12 and putting the signals to "safety." When the train enters block 2, it causes magnet 42 to be energized, and thereby closes the normally open circuit-controllers 29 and 35, so as to put the signals 7 and 8 to "safety" in advance of the train. It also deënergizes magnet 41, thereby opening at 18 and 25 the circuits through clutch-magnets 11 and 12 and putting signals 5 and 6 to "danger" behind the train. As soon as the train passes off of block 1 the clearing-magnet operating circuit-controllers 19 and 26 is deënergized, so as to open these circuit-controllers and restore them to normal condition, in which they remain until closed by a following train in block 1. When the train passes off of block 2, magnet 41 is again energized, so as to close circuit-controllers 18 and 25; but clutch-magnets 11 and 12 remain deënergized, because of the brakes at 19 and 26, and signals 5 and 6 remain at "danger." When the train has passed off of block 2, it no longer controls the circuit of clutch-magnet 11. Hence a following train by closing circuit-controllers 19 may put signal 5 to "safety." It however continues to hold distant signal 6 at "danger," because when it passes off of block 2 and onto subsection 3$^a$ it deënergizes track-magnet 48, thereby opening circuit-controller 23, which is in the circuit of clutch-magnet 12, associated with signal 6. When track-magnet 48 is deënergized, circuit-controllers 28 and 34 are also opened, thereby putting signals 7 and 8 to "danger" behind the train. When the train passes off of block 2, clearing-magnet 42 is deënergized, and circuit-controllers 29 and 35 are thereby restored to their normally open condition. When the train enters subsection 3$^b$, it shunts track-magnet 54, thereby opening at 53 track-circuit of battery 49, so that track-magnet 48 continues to be deënergized. It also energizes clearing-magnet 58 and puts the signals 9 and 10 to "safety" in advance of the train in the manner already explained.

Referring now to Fig. 2, 59, 60, 61, and 62 are the blocks of a track, block 61 being divided into subsections 61$^a$ and 61$^b$. Home and distant signals 63 and 64, 65 and 66, and 67 and 68 are located at the entering ends of blocks 60, 61, and 62, respectively. 69, 70, 71, and 72, and 73 and 74 are clutch-magnets for the respective signals. The signal-circuit of clutch-magnet 69 may be traced from battery 75 through clutch-magnet 69, circuit-controller 76, and common return-wire back to battery. The signal-circuit of clutch-magnet 70 may be traced from battery 78 through circuit-controller 79, clutch-magnet 70, circuit-controller 81, and wire 77 back to battery. The circuit of clutch-magnet 71 may be traced from battery 82 through clutch-magnet 71, circuit-controller 83, wire 77 back to battery. The circuit of clutch-magnet 72 may be traced from battery 84 through circuit-controller 85, wire 86, clutch-magnet 72, circuit-controller 87, and wire 77 back to battery. In this arrangement of circuits the signals stand normally at "safety," and the system is shown in its active condition with reference to a train in subsection 61$^b$.

The operation of the system shown in Fig. 2 is the same as that of Fig. 1, except that in Fig. 2 the signals are normally at "safety," and hence do not require to be cleared in advance of the train. The utility of the resistance-coils of Fig. 2, such as the resistance-coil 94, is to prevent unnecessary loss of battery-power when the train shunts track-magnets, such as magnet 88, and so removes from the track-circuit the resistance of the track-magnet. It will be seen that this resistance is cut into the track-circuit by the operation of magnet, such as 92, whenever a train shunts the track-magnet. The clearing-magnets 42 58, &c., of Fig. 1 also have this same function and advantage. With reference to preventing unnecessary loss of track battery-power they act as resistances to take the place of the resistance of a track-magnet in the same way as do the resistance-coils of Fig. 2. This invention is more particularly addressed to the arrangement of a track-circuit, as herein set forth. This circuit arrangement has special utility as applied to a track-circuit; but it may be applied to a variety of uses, and hence is not to be restricted to its application to a track-circuit.

What I claim, and desire to secure by Letters Patent, is—

1. In an electrical device, the combination of a magnet adapted and designed to be shunted; a resistance; and a circuit-controller operated by the magnet and in multiple with the resistance, whereby when the magnet is energized the circuit-controller closes to cut out the resistance, and when the magnet is shunted the circuit-controller opens to cut in the resistance.

2. In an electrical device, the combination of a magnet adapted and designed to be shunted; a resistance; and a circuit-controller operated by the magnet and in multiple with the resistance, whereby when the magnet is energized the circuit-controller closes to cut out the resistance, and when the magnet is shunted the circuit-controller opens to cut in the resistance; and another resistance in multiple with said magnet and adapted to be shunted when said magnet is shunted.

3. In an electrical device, the combination of a magnet adapted and designed to be shunted; a resistance; and a circuit-controller operated by the magnet and in multiple with the resistance, whereby when the magnet is energized the circuit-controller closes to cut out the resistance, and when the magnet is shunted the circuit-controller opens to cut in the resistance; and a second magnet for operating a circuit in multiple with said first magnet and adapted to be shunted simultaneously with the shunting of said first magnet.

4. In an electrical device, the combination of a circuit-operating magnet; a controlling-magnet adapted and designed to be shunted; a shunt-circuit around said first-mentioned magnet and including a circuit-controller operated by the controlling-magnet, whereby when the controlling-magnet is energized its circuit-controller closes to cut out the circuit-operating magnet and when the controlling-magnet is shunted its circuit-controller is opened to cut in said circuit-operating magnet.

5. In an electrical device, the combination of a circuit-operating magnet; a controlling-magnet adapted and designed to be shunted; a shunt-circuit around said first-mentioned magnet and including a circuit-controller operated by the controlling-magnet, whereby when the controlling-magnet is energized its circuit-controller closes to cut out the circuit-operating magnet and when the controlling-magnet is shunted its circuit-controller is opened to cut in said circuit-operating magnet; and a resistance in multiple with the controlling-magnet and adapted to be shunted when the controlling-magnet is shunted.

6. In an electrical device, the combination of a circuit-operating magnet; a controlling-magnet adapted and designed to be shunted; a shunt-circuit around said first-mentioned magnet and including a circuit-controller operated by the controlling-magnet, whereby when the controlling-magnet is energized its circuit-controller closes to cut out the circuit-operating magnet and when the controlling-magnet is shunted its circuit-controller is opened to cut in said circuit-operating magnet; and a magnet for operating a circuit and in multiple with the controlling-magnet and adapted to be shunted when the controlling-magnet is shunted.

7. In a railway signaling system, the combination of a track-circuit including a track-magnet connected to a track-section near one end, a generator connected to said track-section near the other end and a circuit-controller; with a second magnet in multiple with the track-magnet and adapted to be shunted simultaneously therewith and controlling said circuit-controller; and a resistance arranged to be cut into circuit with the battery when the track-magnet is shunted and to be cut out of circuit when the track-magnet is not shunted.

8. In a railway signaling system, the combination of a track-circuit including a track-magnet connected to a track-section near one end, a generator connected to said track-section near the other end and a circuit-controller; with a second magnet in multiple with the track-magnet and adapted to be shunted simultaneously therewith and controlling said circuit-controller; and a magnet controlling a signal arranged to be cut into circuit with the battery when the track-magnet is shunted and to be cut out of circuit when the track-magnet is not shunted.

9. In a railway signaling system, the combination of a track-circuit including a track-magnet connected to a track-section near one end, a generator connected to said track-section near the other end and a circuit-controller; with a second magnet in multiple with the track-magnet and adapted to be shunted simultaneously therewith and controlling said circuit-controller; and a resistance arranged to be cut into circuit with the battery when the track-magnet is shunted and to be cut out of circuit when the track-magnet is not shunted, and a second circuit-controller in said track-circuit and controlled by another circuit.

10. In a railway signaling system, the combination of a track-circuit including a track-magnet connected to a track-section near one end, a generator connected to said track-section near the other end and a circuit-controller; with a second magnet in multiple with the track-magnet and adapted to be shunted simultaneously therewith and controlling said circuit-controller; and a resistance arranged to be cut into circuit with the battery when the track-magnet is shunted and to be cut out of circuit when the track-magnet is not shunted; a second track-circuit including a track-magnet connected to a second track-section near one end and controlling the first track-circuit, a generator and a circuit-controller connected to said second track-section near its other end; a magnet controlling said last-mentioned circuit-controller, and in multiple with the track-magnet of the second track-circuit and adapted to be shunted simultaneously with said last-mentioned track-magnet; and a signal-controlling magnet arranged to be energized by the last-mentioned generator when the track-magnet of the second track-circuit is shunted and arranged to be deënergized when said track-magnet is not shunted.

In testimony whereof I have signed my name to this specification in the presence of two subscribing witnesses.

ROBERT J. HEWETT.

Witnesses:
NICHOLAS M. GOODLETT, Jr.,
ELI J. BLAIR.